Sept. 27, 1966  J. M. TYRNER  3,274,778
ACTUATOR WITH HIGH FLUID PRESSURE
Filed March 10, 1965  5 Sheets-Sheet 1

INVENTOR.
Joseph M. Tyrner
BY Emery, Whittemore,
Sanchez & Graham
ATTORNEYS

Sept. 27, 1966   J. M. TYRNER   3,274,778
ACTUATOR WITH HIGH FLUID PRESSURE
Filed March 10, 1965   5 Sheets-Sheet 2

D.C. CONTROL SIGNAL

A.C. CURRENT IN LIQUID

A.C. POWER SUPPLY

INVENTOR.
Joseph M. Tyrner
BY Emery, Whittemore,
Sandoe & Graham
ATTORNEYS

Sept. 27, 1966  J. M. TYRNER  3,274,778
ACTUATOR WITH HIGH FLUID PRESSURE
Filed March 10, 1965  5 Sheets-Sheet 4

INVENTOR
Joseph Tyrner
BY Emery, Whittemore,
Sandoe & Graham
ATTORNEYS.

Sept. 27, 1966    J. M. TYRNER    3,274,778
ACTUATOR WITH HIGH FLUID PRESSURE
Filed March 10, 1965    5 Sheets-Sheet 5

FIG. 14.

FIG. 15.
CHARACTERISTIC OF POWER SUPPLY

FIG. 16.
PRESSURE CONTROL

INVENTOR
Joseph Tyrner
BY Emery, Whittemore
Sandoe & Graham
ATTORNEYS.

United States Patent Office 3,274,778
Patented Sept. 27, 1966

3,274,778
ACTUATOR WITH HIGH FLUID PRESSURE
Joseph M. Tyrner, M.R. 17, Morristown, N.J.
Filed Mar. 10, 1965, Ser. No. 438,556
17 Claims. (Cl. 60—52)

This application is a continuation-in-part of my application Serial No. 100,989, filed April 5, 1961, for Actuator With High Fluid Pressure, now abandoned.

This invention relates to control apparatus and more especially to control apparatus having electro-dynamic actuators.

The electric actuation of servo mechanisms becomes a problem when forces of any appreciable magnitude are required. At present, only the electric motor is available to translate the control signal into the control force. However, by its very nature, the electric motor is a high-speed, low-torque device, and requires the addition of mechanical or hydraulic elements to deliver high forces at low speed.

It is an object of the invention to provide a device in which electrical energy is converted directly into a controlled hydraulic pressure. A pressure of several hundred pounds per square inch is feasible. The unit is static and has no moving parts. It obtains its power directly from the power line to which it is continuously connected. The control is electric and requires little power. In many cases the control signal may be used without any power amplification.

It is another object of the invention to provide an actuator of the character indicated and in which the parts are of simple and rugged construction so that the actuator is low in cost and rugged in construction.

Other objects, features and advantages of the invention will appear or be pointed out as the description proceeds.

In the drawing, forming a part hereof, in which like reference characters indicate corresponding parts in all the views.

Figures 1, 2, 3, 4, 5:
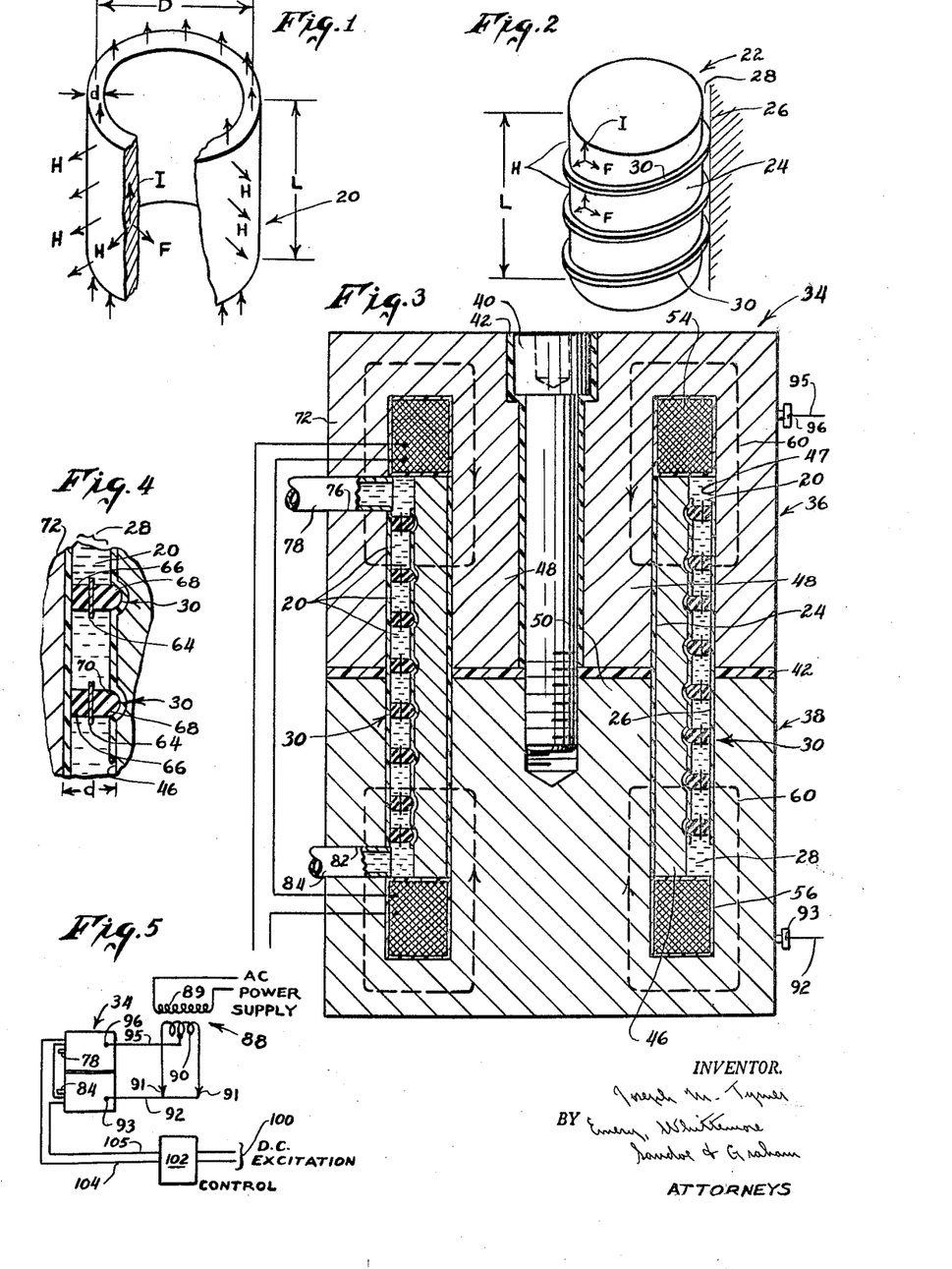
FIGURE 1 is an isometric diagram illustrating the principle of the invention.
FIGURE 2 is an isometric diagram showing a core and barrier used for increasing the force developed by the invention.
FIGURE 3 is a sectional view through an actuator made in accordance with this invention.
FIGURE 4 is an enlarged, fragmentary, sectional view showing the construction of the barrier used in the actuator of FIGURES 3.
FIGURE 5 is a wiring diagram for the actuator shown in FIGURE 3.

The actuator of this invention generates pressure by electrical means in liquid which fills a chamber of annular cross section. This liquid 20, with all of the structure of the actuator removed, is shown in FIGURE 1.

The liquid 20 is electrically conductive and current flows through it in an axial direction. The current is indicated by the axially extending arrow I and by the smaller arrows at the end faces of the liquid mass.

The liquid is also traversed by a magnetic flux. This flux extends radially and is indicated by the arrows H. The co-action of the flux H and the current I produces force in a tangential direction, as indicated by the arrow F. This force F is computed by Biot-Savart's law:

$$F = IHL \frac{10^{-6}}{9.81} \quad (1)$$

where $F$ = force in kilograms
$I$ = total current in amperes in cross section of liquid (cross section liquid = $\pi D \times d$)
$H$ = magnetic field intensity in gauss
$D$ = mean diameter of liquid mass in centimeters
$L$ = axial length of liquid mass in centimeters
$d$ = radial width of liquid mass in centimeters (this radial width is referred to in the specification as the "gap").

If the liquid 20 is prevented from moving, the force F will manifest itself as pressure:

$$F = pLd \quad (2)$$

where $p$ = pressure in kilograms per square centimeter

Combining Equations 1 and 2, the pressure may be computed:

$$p = \frac{IH}{d} \frac{10^{-6}}{9.81} \quad (3)$$

It is not necessary that the current I and flux H, at every cross section, have the same direction and the same magnitude. It is sufficient that their relation be such as to always produce force in the same rotational direction.

Equation 3 shows that the magnitude of the pressure is determined by the total current I, by the intensity of the magnetic field H, and by the radial width of the gap $d$. If the pressure is to be increased, the current I and/or the flux H must be increased; or the radial width of the gap $d$ must be decreased. Any such changes, however, necessarily reach a practical limit. The current density in the liquid, that is, the current per unit area of cross section, must be limited to a maximum determined by the dissipation of the ohmic losses.

Further increase in total current, therefore, requires an increase in cross section of the liquid but this would requre an increase in D or $d$, or both. Since an increase of $d$ automatically reduces the pressure, as shown in Equation 3, only D can be increased; but as a practical device, a large value of D is undesirable.

The other factor which could be increased is the intensity of the magnetic flux H, but again, this is limited by economic limitations for the excitation.

This invention increases the pressure delivered by the actuator by combining, in series, the pressures developed in a number of different chambers, arranged in such a way that the pressures of the chambers are added to one another. The preferred construction for obtaining this result is illustrated in FIGURE 2. A core 22 has a circumferential surface 24 which forms the inside wall of a chamber for containing the liquid 20. The liquid is omitted in FIGURE 2 for clearer illustration. The outside of the chamber is formed by a housing wall 26. The chamber is indicated by reference character 28.

In order to obtain a plurality of chambers in series with one another, a helical barrier means 30 is wrapped around the core 22 and this barrier divides the chamber 28 into a group of subchambers which merge into one another. The space between each successive convolution of the barrier means 30 can be considered a subchamber; and these subchambers communicate with one another without reduction in cross section at the communications. It will be evident that the chamber 28 can be divided into series-related subchambers by other kinds of barrier means, such as circumferential fins with communicating passages, but such constructions are more expensive to manufacture and offer more resistance to flow of liquid from one subchamber to the next.

The helical barrier means 30 actually forms the space of the chamber 28 into a spiral ribbon; but it does not interfere with the axial flow of current through the liquid because the barrier means 30 is electrically conductive, though insulated from the walls of the space. The direction of the magnetic flux is not changed by the presence of the barrier means 30.

Under the construction illustrated in FIGURE 2, each subchamber produces the same pressure as was previously produced by the full length chamber, and as indicated by the small vector diagrams on the surface of the core 22 in FIGURE 2.

The total pressure generated with the construction shown in FIGURE 2, at the upper end of the helical barrier means 30, is equal to the pressure of each subchamber times the number of subchambers, and may be expressed as follows:

$$p_t = np = n\frac{IH}{d} \frac{10^{-8}}{9.81} \qquad (4)$$

The length L which was unimportant in FIGURE 1, now becomes important because it determines the number of convolutions which can be obtained without making the cross section of the convolutions so small as to offer excessive resistance to flow of the liquid.

In the discussion of FIGURE 1, reference was made to preventing the liquid from flowing. In FIGURE 2 it will be evident that liquid will be prevented from flowing if the upper end of the chamber 28 is closed because the spiral ribbon will thereby be dead-ended.

In actuators made in accordance with the principle of this invention, there is liquid flow only under transient conditions; a fluid outlet being provided at the upper end of the chamber for transmitting the pressure to the apparatus which is to be actuated. The speed of flow for the transient conditions may be computed by determining the pressure drop as a function of flow velocity from Fanning's equation. The pressure drop plus the resistance opposing the motion are equal to the produced pressure.

FIGURE 3 shows an actuator 34 having an upper cup 36 and a lower cup 38 secured together by a screw 40. There is electrical insulating material 42 between the confronting faces of the cups 36 and 38; and there is other electrical insulating material 42 between the screw 40 and the upper cup 36.

These cups 36 and 38 have annular recesses therein which register with one another to form the chamber 28 of the actuator. There is a sleeve 46 telescoped over the portions of the cups 36 and 38 which are surrounded by the annular grooves and which form cores 48 and 50 of the actuator.

The cups 36 and 38 are made of paramagnetic material, preferably iron; and the sleeve is also made of paramagnetic material and forms a part of the core of the actuator. It is coated with electrical insulating material 42.

The walls of the chamber 28 are coated with electrical insulating material 42 except near the ends. There is a cylindrical area 47 of bare metal on both sides of the chamber 28 in the region of the least convolution at both ends of the barrier means 30 so that current can flow from the metal to the liquid at one end and from the liquid to the metal at the other end of the chamber 28.

There are magnetic windings 54 and 56 at the opposite ends of the chamber 28. These magnetic windings are held in place by the sleeve 46 which serves as a spacer. The direction of the flux paths around the magnetic windings 54 and 56 are indicated by the dot-and-dash lines 60 and their associated arrowheads. It will be evident that all of the flux paths through the liquid in the chamber 28 will be in an outward direction, thus producing flow forces in the same radial direction in all of the subchambers between different convolutions of the helical barrier means 30.

FIGURE 4 shows a preferred construction for the helical barrier means 30. A spiral strip of metal 64 forms the body of the barrier, and there are insulating spacers 66 and 68 on radially opposite sides of the strip 64. These spacers 66 and 68 are preferably resilient and under some deformation when assembled in the actuator. The helical barrier means is restrained against axial displacement by the spacer 68 which is bonded to the strip 64 and recessed into a helical groove 70 formed in the outside surface of the sleeve 46. In the preferred construction the spacer 68 is stretched somewhat in placing it around the sleeve 46, and the tension developed holds the helical barrier means in assembled relation with the sleeve 46. The outside spacer 66 is under some compression by the side wall of the chamber; this side wall being indicated by the reference character 72.

Referring again to FIGURE 3, there is a liquid discharge passage 76 through the wall 72 near the upper end of the chamber 28. Tubing 78 is secured to the actuator in register with the discharge passage 76.

A liquid inlet passage 82, at the lower end of the chamber 28, is connected with a similar tubing 84.

The tubing 78 of the actuator is connected with the device which is to be actuated, and the tubing 84 is connected with a supply of make-up liquid.

FIGURE 5 shows a wiring diagram for the actuator shown in FIGURE 3. A transformer 88 has a primary coil 89 connected with a source of alternating current; and has a secondary coil 90 connected with rectifiers 91 in a circuit 92 leading to a terminal 93 on the housing of the actuator. This terminal 93 is in the circuit with the liquid in the actuator through the bare metal area 47 near the lower part of the chamber 28. A conductor 95 leads from a terminal 96, near the upper end of the actuator, to a center tap on the secondary coil 90 of the transformer 88. This terminal 96 is in the circuit with the liquid in the actuator through the bare metal area 47 which is near the upper part of the chamber 28.

The electro-magnetic windings 54 and 56 are supplied with current from a direct current power source 100 through a controller 102. By changing the excitation of the windings 54 and 56, the force developed in the liquid can be varied; and the direction of the force can be reversed by reversing the direction of flow of power from the power line 100 through the controller 102 and through the conductors 104 and 105 by which the controller 102 is connected to the windings 54 and 56.

Figures 6, 7, 8:
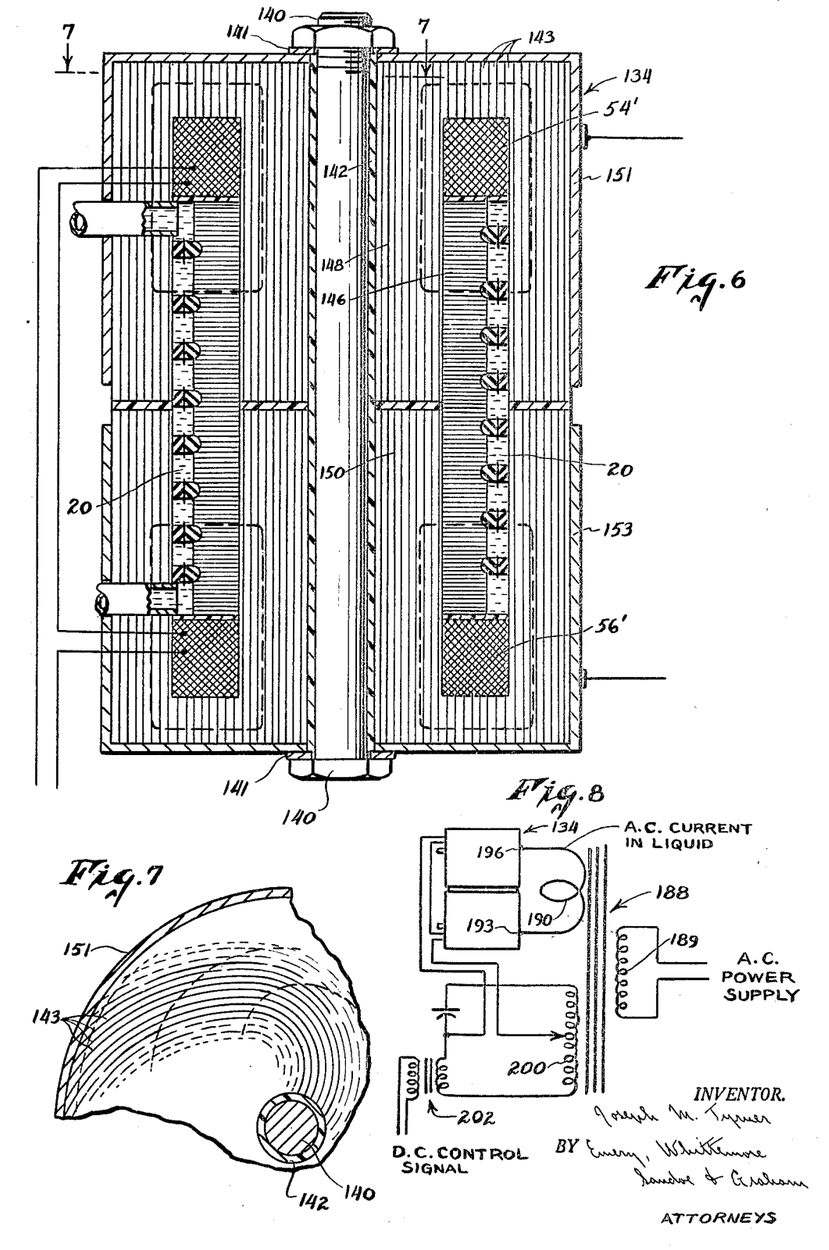
FIGURE 6 is a sectional view, similar to FIGURE 3, but showing a modified form of the invention.
FIGURE 7 is an enlarged sectional view, on the line 7—7 of FIGURE 6.
FIGURE 8 is a wiring diagram for the actuator shown in FIGURES 6 and 7.

FIGURE 6 shows an actuator 134 which is similar in principle to the actuator shown in FIGURE 3, except that it is designed for use with alternating current. When the device operates with an alternating current and an alternating field, Formula 4 is valid only for instantaneous values of current, field and pressure. The mean value of the pressure becomes $$P_{ac} = \frac{m}{d} HI \frac{.57}{9.81} 10^{-6} \sin \text{Lambda} \quad (5)$$

In this formula:

$P_{ac}$ = the average value of the pressure in kg./cm.$^2$
$H$ = the maximum value of the magnetic field intensity in gauss
$I$ = the R.M.S. value of the current
The angle Lambda = the phase displacement between current I and field intensity H.

Parts of the construction which are the same as in FIGURE 3 are indicated by the same reference character but with a prime appended.

The cups of FIGURE 6 are somewhat different in construction because they must be laminated; and because of this laminated construction, the cups are held together by a bolt 140 extending through the entire length of the actuator. There are washers 142' at opposite ends of the bolt 140; and there is electrical insulation 142 between the bolt 140 and the laminations 143 which form cores 148 and 150 for the actuator. A sleeve 146 surrounds the cores 148 and 150 and is made with laminations consisting of piled-up annular washers.

The cups forming the opposite halves of the actuator 134 have the laminations 146 confined in shells 151 and 153.

To reduce eddy current losses in the iron, the laminations 143 should extend in a generally radial direction. This would be objectionable because the laminations would diverge from one another. Substantially the same effect can be obtained by curving the individual laminations as shown in FIGURE 7, where each lamination follows the curve of an involute. This curve causes the laminations to fill the cross section of the iron portions of the actuator. The laminations 143 are straight in directions parallel to the longitudinal axis of the actuator.

FIGURE 7 shows the curvature of the laminations 143. In the construction illustrated, these laminations have the curvature of an involute.

FIGURE 8 shows a wiring diagram for the actuator shown in FIGURE 6. Formula 5 shows that the pressure $P_{ac}$ depends on the phase relations between current and field. This may be used for control of the pressure by using a circuit as shown in diagram FIGURE 8. Power for both the current through the liquid and for the exciting current for the coils 54' and 56' is obtained from a transformer 188. This transformer has a primary coil 189 connected with a source of alternating current. The transformer has a secondary winding 190 which supplies power to terminals 193 and 196 at opposite ends of the chamber which contains the liquid. The transformer 188 has another secondary winding 200 which supplies power for exciting the magnetic coils of the actuator 134.

The exciting current to the actuator 134 is varied to control the force developed by the actuator, and in the construction illustrated, this control is obtained by means of a saturable reactor 202 connected in the circuit of the secondary winding 200. This saturable reactor is controlled by a D.C. signal which changes the reactance of it and consequently changes the phase of the voltage for the field excitation, which is obtained from the bridge connection between the tap on winding 200 and the center point of the capacitor-reactance load. Obviously a control which affects only the amplitude of the excitation also is possible. It is identical to the control circuit shown in FIGURE 5 if the direct current used there is replaced by alternating current. This saturable reactor is representative of means for supplying a controlled signal to the exciting circuit of the actuator 134.

In the devices shown in FIGURES 3 and 6, the current I was derived from outside sources. It is also possible to establish a flow of current in the liquid by inductive means without recourse to an outside source. Such a device operates on the principle of the induction motor.

Figure 9:
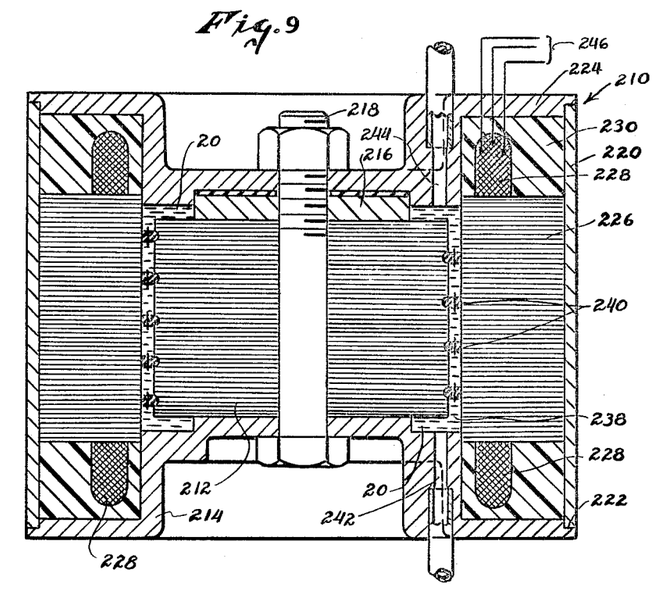
FIGURE 9 is a vertical sectional view similar to FIGURES 3 and 6, but showing a second modified form of the invention.

FIGURE 9 shows this modified form of the invention. In the actuator 210 a laminated stator 226 is equipped with a polyphase winding 228 which produces a rotating field. The rotation of the field relative to the liquid in the gap 238 induces a current I which then coacts with the inducing field and generates the desired pressure in essentially the same way as in the devices illustrated in FIGURES 3 and 6.

An actuator operating on this principle has a laminated core 212 inside of the stator 226, leaving the gap 238 with the liquid between them. The core 212 is clamped between a base 214 and a nut 216 screwed down on the threads of a bolt 218. There is an outer shell 220 which seats in a step 222 at the periphery of the base 214. The shell 220 is clamped down on the base 214 by a cover 224. The stator 226 with the winding 228 is enclosed in the shell 220. The empty space around the winding 228 is filled with an encapsulation compound leaving no void inside of the body of the actuator except for the liquid-filled chamber 238. This chamber 238 is divided into a plurality of series-related subchambers by a helical barrier means 240 which may be identical with the barrier means 30 shown in FIGURE 4.

The liquid chamber 238 overlaps the ends of the laminated core 212 for a limited radial extent. The rings of liquid 20 take the place of the short circuit rings on a squirrel cage rotor. Since they close the circuit for the induced current, these rings may also be used for passages 242 and 244 opening through the base 214 and the cover 224, respectively. The passage 242 permits replacement liquid to enter the chamber 238; and the passage 244 supplies liquid under pressure to the apparatus that is to be actuated.

In the construction shown in FIGURE 9, the core 212 is shown as laminated but solid, but it can be hollow to reduce the weight of the core. There are no windings on the core 212. The controller for the actuator of FIGURE 9 must be connected in the circuit of a power supply line 246 by which the windings 228 are energized. This is a simple circuit; but it does require that the controller must be large enough to control the full current supplied to the actuator, and for larger units the use of separate control signal circuits is preferable.

Instead of controlling the power supply of the device, it is also possible to control the produced pressure by changing the magnetic reluctance of the core. If the reluctance is increased by a superimposed D.C. saturation, the rotating field is weakened and with it the induced current. This results in a reduced pressure.

Figure 10:
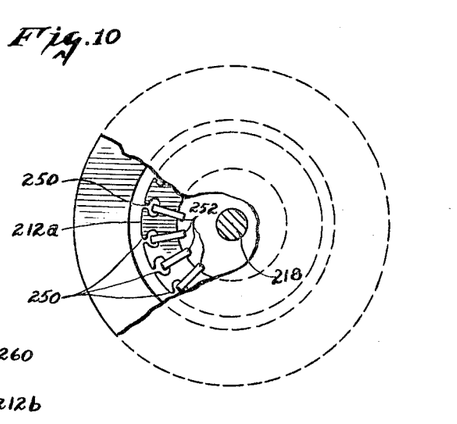
FIGURES 10 and 11 are sectional views through the core of an actuator, such as shown in FIGURE 9, but showing two different modified constructions of the core.
Figure 11:
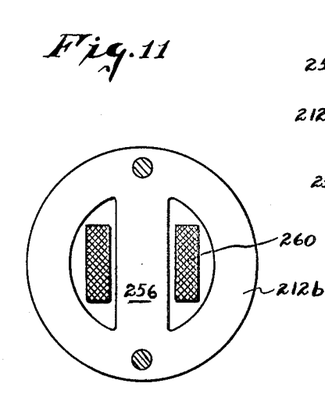

FIGURES 10 and 11 show two constructions for such a superimposed D.C. excitation of core 212.

In FIGURE 10 the core 212a has a center opening and slots 250 on the outer periphery. A toroidal winding is placed into the slots and the center. This winding, excited by a D.C. signal, produces a circumferential D.C. field which saturates, in a controllable way, the core 212a and reduces its conductivity for the flux from the stator 226.

In FIGURE 11 the D.C. flux in the core is excited by a winding on a center leg 256. Here too, a D.C. signal is impressed on the winding and produces a D.C. field which, issuing from the center leg, flows through the core and saturates it.

In both cases, the pressure generated by the actuator depends on the magnitude of the D.C. signal. The windings 252 in FIGURE 10 and the windings 260 in FIGURE 11 carry only the control signal current and the controls used in the circuits with these windings can be much smaller than those which have to carry the full power supply to the actuator, as in FIGURE 9.

Figure 12:
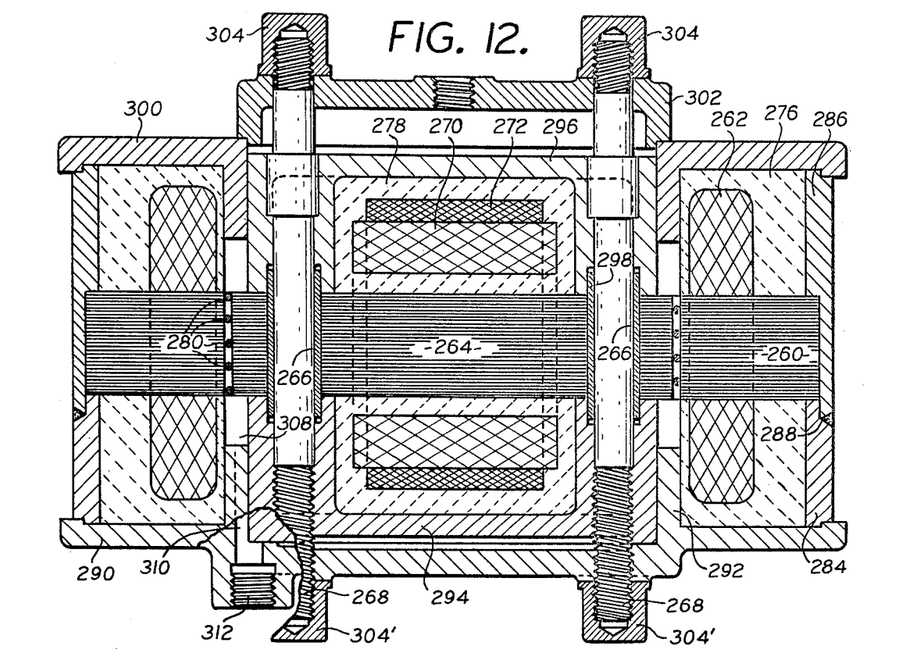
FIGURE 12 is a sectional view through another modified form of the invention.

FIGURE 12 shows a construction having a stator 20 which is of laminated construction and annular except for slots for holding stator windings 262. In the preferred construction there are thirty-six slots; that is, twelve slots per phase around the inside of the stator core. The actuator has an inner core 264 with openings 266 for receiving bolts 268 which hold the actuator assembly together. The inner core 264 has openings for receiving an exciter core winding 270 and a trigger core winding 272 which is preferably located outside of the exciter core 270.

The stator winding 262 is encased in an epoxy encapsulation 276 and the coils 270 and 272 are enclosed in similar encapsulation 278.

Around the periphery of the inner core 264, there is a helical groove which holds a barrier coil 280. This barrier coil 280 extends for some radial distance beyond the periphery of the inner core 264 and it contacts with the inner cylindrical face of the stator core 260. Thus the barrier coil 280, in effect, divides the space between the inner core 264 and the stator core 260 into a series of spaces which hold liquid and which constitute the chamber for the liquid which is subject to displacement by the magnetic field of the actuator, as has already been explained in connection with the other forms of the invention.

The stator 260 rests on an upper annular surface of a cylindrical shell 284 and there is another cylindrical shell 286 which extends downwardly around the outer periphery of the stator core 260. The shells 284 and 286 are preferably connected together by welding 288. A lower stator cover 290 fits over the bottom of the shell 284 and has a portion 292 extending upwardly into the space within the lower part of the stator field coils 262.

There is a lower frame or spacer 294 which fits down into the actuator within the annular portion 292; and this spacer 294 holds the encapsulation 298 and the other parts of the inner core assembly, including the windings 270 and 272. A corresponding upper frame or spacer 296 fits over the upper part of the inner core assembly. The bolts 268 extend through the openings 266 in the inner core 264 and are separated from the sides of the openings 266 by insulating bushings 298.

An upper stator cover 300 fits over the top of the shell 286 and is held down by a cover 302 which is clamped against the stator cover 300 by threaded caps 304 at the upper ends of the bolts 268. There are similar threaded caps 304′ at the lower ends of each of the bolts 268. These caps have flat sides so that they can be tightened with a wrench.

A barrier coil 280 is preferably made of stainless steel tubing open at one end and closed at the other. The open end of the tubing is preferably the end which is subjected to the higher pressure of the liquid in the liquid chamber, designated generally by the reference character 308. At the lower end of this chamber 308, there is a passage 310 in the stator cover 290, leading to an outlet 312 to which a tube or conduit 318 is connected for putting the chamber 308 in communication with a cylinder-and-piston motor or other pressure-responsive means that is to be actuated by the liquid pressure from the chamber 308. This passage 310 and the outlet 312 is actually located 90° around the stator cover 290 from the bolts 268, but one of the bolts is broken away and the construction is shown in a rotated position for clearer illustration.

Figure 13:
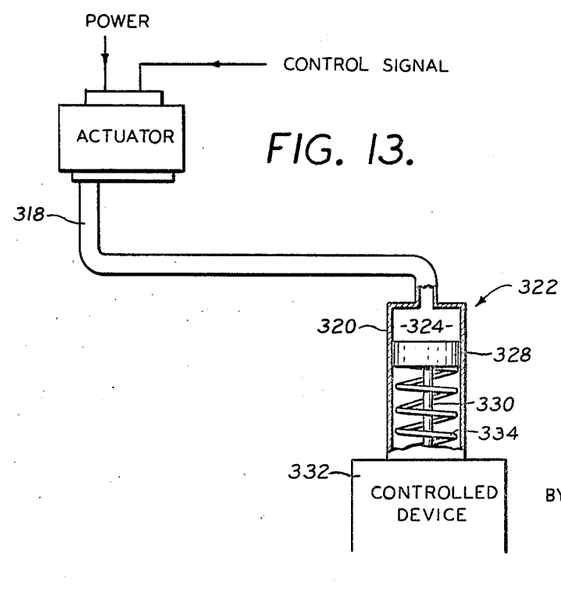
FIGURE 13 is a diagrammatic view showing a pressure actuator of this invention combined with a cylinder-and-piston motor to make a simple, effective and inexpensive remote control.

FIGURE 13 shows the actuator connected with a conduit 318 leading to one end of a cylinder 320 of a cylinder-and-piston motor 322. The upper end of the cylinder 320 provides a chamber 324 which is preferably filled with liquid, and so is the conduit 318 back to the actuator. Thus any pressure in the actuator, tending to displace liquid from the actuator, is transmitted to the column of liquid in the conduit 318 and in the chamber 324 to the head of a piston 328 in the cylinder 320. If the pressure is sufficient, the piston 328 is moved as liquid is forced out of the actuator through the conduit 318.

The piston 328 comprises, therefore, a movable wall for the chamber 324 and a piston rod 330 integrally connected with the piston 328, provides a motion-transmitting connection for transmitting motion from the piston 328 to any switch or other apparatus in a controlled device 332. A helical spring 334 is compressed between the piston 328 and the controlled device 332. As the piston 328 is forced downwardly, by pressure of liquid from the actuator flowing through the conduit 318, the tension in the spring 338 increases in proportion to the displacement of the piston. At some point, the pressure above the piston is equal to the force of the spring 334 below the piston and equilibrium is established. Thus, for any given pressure of liquid from the actuator, there is a corresponding position of equilibrium of the piston 328. The actual position of the piston 328, can, therefore, be controlled by controlling the pressure supplied by the actuator through the conduit 318.

Figure 14:
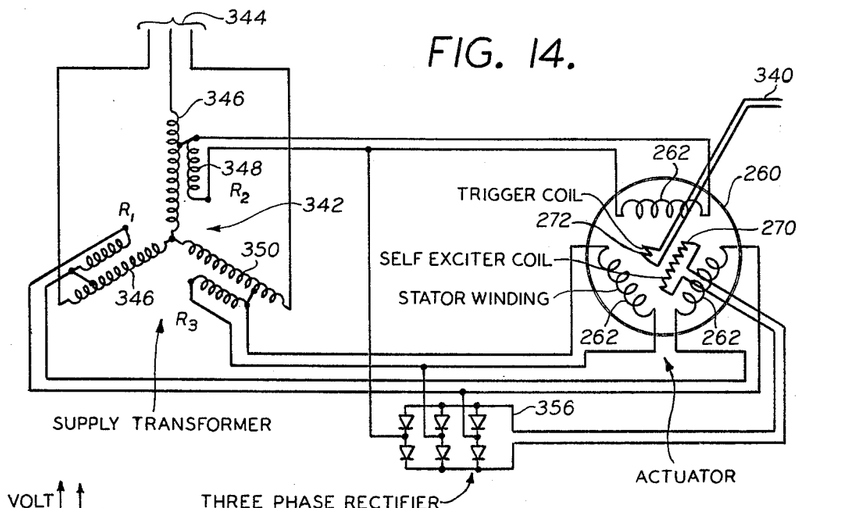
FIGURE 14 is a wiring diagram showing the actuator of FIGURE 12 connected with a transformer and with feed back for the exciter current supply.

FIGURE 14 shows the stator 260 and the stator windings are represented by the three seal coils 262, though in actual practice, there are ordinarily considerably more coils than shown in FIGURE 14. The exciter coil 270 is also shown in FIGURE 14 and so is the trigger coil 272. This later coil 272 is connected with a circuit 340 to which control signals are supplied.

Power for energizing the coils 262 is supplied from a power source which is shown in FIGURE 14 as a transformer 342. This transformer is supplied with three-phase power from a power line 344. The primary coils of the transformer 342 are indicated by the reference characters 346 and the secondary coils by the reference characters 348. These secondary coils 348 are connected to suiable taps 350 on the primary coils 346, and to obtain proper phase relation a zig-zag connection which turns on two legs 351 and 352 are used for the secondaries of the transformer.

Each of the secondary transformer coils 348 is connected with one of the stator coils 262. In the circuit shown, the changing voltage on the stator winding is connected through a three-phase rectifier 356 which feeds back direct current to the exciter coil 270.

The very nature of the actuator makes it possible to reduce the magnetic reluctance of the field path by a superimposed direct current saturation. The coil 270 provides the direct current. There is ample room for this coil on the actuator because of the fact that the inner coil of the actuator does not need other windings. The increased reluctance not only reduces the field strength, it also affects the stator current. The voltage impressed on the stator is opposed by two voltage components, the impedance drop and the voltage induced by the gap field.

When the field is weakened for control purposes, the voltage induced by the field is also reduced. The stator current increases until the impedance drop becomes large enough to compensate for the reduction of the induced voltage. An excesive rise in the current can be prevented by giving the power supply to the stator winding a drooping volt-ampere characteristic.

Figure 15:
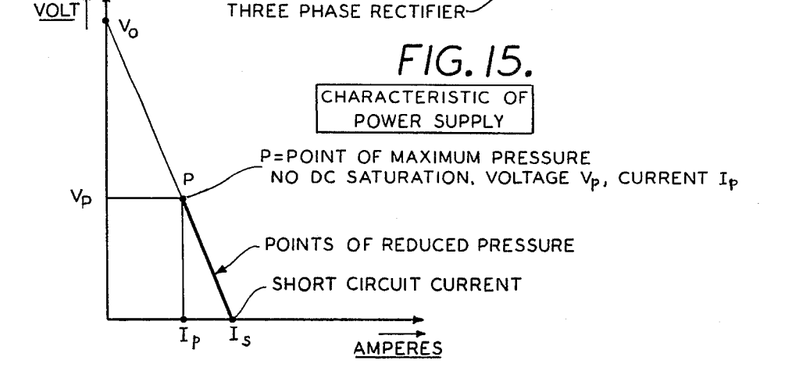
FIGURE 15 is a diagram showing the characteristics of the power supply transformer shown in FIGURE 14.

In order to obtain this drooping volt-ampere characteristic the transformer 342 is made with loose coupling between the primary and secondary coils and it provides a suitable supply of current because the secondary voltage drops when the secondary current rises. The characteristics of such a transformer are shown in FIGURE 15.

As long as the impedance in the circuit of the stator coils is not reduced by a superimposed direct current excitation, there is no potential difference between the R ends of the secondaries. As soon as a direct current excitation is superimposed, a potential difference in the R ends appears and is supplied to the rectifier 356. This potential difference increases with increased direct current excitation and therefore leads to a runaway positive feed back. This runway must be prevented.

Figure 16:
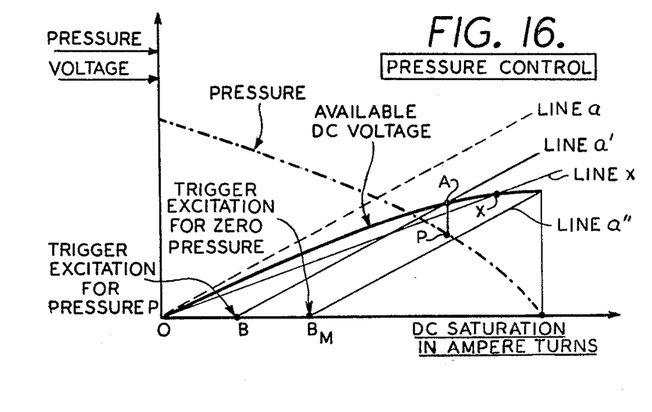
FIGURE 16 is a diagram showing the operation of the control illustrated in FIGURE 14.

FIGURE 16 shows pressure and rectifier direct current voltage as functions of the direct current excitation. If the resistance drop of the self-exciter coil 270 or certain direct current excitation is lower than the rectified voltage available at the same excitation, the feed back will run away until the two become equal. For instance, if the coil voltage is represented by the line X, equilibrium exists only at point X. The coil resistance, therefore, must be raised until the coil voltage line "a" is at least as steep as the line which is a tangent at point O on the curve of the rectifier voltage.

With such a coil characteristic, it is necessary to add the trigger excitation of coil 272 to induce self-excitation. Such an excitation shifts the coil characteristics parallel to itself. For instance, line "a" becomes line "a'" for the trigger excitation OB. The equilibrium point is A with the corresponding presure P. The small trigger excitation is amplified by the actuator itself and the result is a response to a weak signal. By having the trigger coil 272 a separate coil on the inner core, the control is completely independent of the circuit of the actuator.

The preferred embodiments of the invention have been illustrated and described, but changes and modifications can be made and some features can be used in different combinations without departing from the invention as defined in the claims.

What is claimed is:

1. An actuator including a body enveloping an internal chamber which corresponds generally to the outer surface of the body in the two dimensions of that surface and which includes walls closely spaced in the dimension perpendicular to said outer surface, said chamber being filled with an electrically-conductive liquid, barrier means in the chamber extending in the narrow dimension and dividing the chamber into a multiplicity of communicating subchambers, an electric circuit for establishing a magnetic flux traversing the chamber in the direction of the narrow spacing and for establishing a current flow through the liquid in a direction transverse of the magnetic flux, and other means including a second electric circuit and a flux device on the body and controlled by the second electric circuit whereby to vary the flux established by the first electric means in accordance with control signals imparted to said other means.

2. The actuator described in claim 1 and in which the chamber is formed by two concentric, closely spaced cylindrical walls, the difference of the radii being the narrow dimension, and the means for establishing a magnetic flux is oriented to establish flux traversing the chamber in a radial direction.

3. The actuator described in claim 1 and in which the barrier is a helix dividing the chamber into a helical ribbon.

4. The actuator described in claim 1 and in which the barrier means is an electrical element wrapped around the core and extending across the full radial width of the chamber.

5. The actuator described in claim 1 and in which the means for establishing a magnetic flux is a winding on the actuator and the other means for varying the flux established by the first electric circuit means is a second winding in a different circuit and carrying a different current from the first winding.

6. The actuator described in claim 1 and in which the current is induced in the liquid by a rotating field excited by the first winding, said first winding being a polyphase winding in one of the chamber walls.

7. The actuator described in claim 1 and in which the barrier means includes an electrically conductive portion extending through the full axial thickness of the barrier means for conducting current from the liquid on one side of the barrier means to liquid on the other side, and includes also electrical insulating portions that contact with the core and the side wall on the radially-spaced opposite sides of the conductive portion.

8. The actuator described in claim 1 and in which both the inner and outer parts of the body are laminated to reduce the induction of eddy currents.

9. Control apparatus comprising an actuator including a housing having an electrically conductive liquid therein, a power supply connected for supplying electric current for flow through the liquid in the housing, a magnet providing a flux field through the liquid in the housing, for displacing the liquid from the housing, said magnet having a coil thereon for producing the flux field, a hydraulic device including a chamber having a movable wall, a conduit through which the liquid space of the actuator connects with a chamber of the hydraulic device, and yielding means urging the movable wall to move in a direction opposite to that in which said wall is moved by the liquid pressure through said conduit from the actuator through said conduit from the actuator, and a control circuit including a second coil in a different circuit from the first coil for varying the flux field separately of the power supply to the liquid to change the force against said yielding means irrespective of changes in the current flow through said liquid.

10. The control apparatus described in claim 9 characterized by means associated with the actuator for changing the magnetic reaction that displaces the liquid, the hydraulic device being a single acting cylinder-and-piston motor, and the movable wall being the piston, and the yielding means being a spring that is tensioned by movement of the piston in response to the pressure of liquid in the conduit whereby the piston moves into a different balanced position for every change in pressure of the liquid, and a controlled device operated by movement of the piston.

11. The control apparatus described in claim 9 characterized by the connection between the actuator and the hydraulic device being connected only with the chamber having the movable wall so that flow of liquid back and forth between the actuator and the hydraulic device is in the same conduit and the same liquid acts as the pressure-transmitting medium at all times.

12. An actuator comprising a housing having a chamber for an electrically conductive liquid, a stator having windings for generating a magnetic field that passes through the chamber for inducing current flow in the liquid and magnetic reaction urging a movement of the liquid and resulting increase in pressure at one end of the chamber, a connection for supplying alternating current to the stator winding, means for superimposing a direct current saturation on the field path of the magnetic flux that urges movement of liquid in the chamber, and a control circuit that supplies a trigger excitation to the means for superimposing the direct current saturation to change the magnetic reaction urging movement of the liquid.

13. The actuator described in claim 12 characterized by the means for superimposing a direct current saturation on the field path including a coil for direct current for the saturation and a separate coil for a trigger excitation.

14. The actuator described in claim 13 characterized by the direct current saturation coil and the trigger excitation coil being on a core that is on an opposite side of the chamber from the stator.

15. The actuator described in claim 14 characterized by said chamber being of annular cross-section with the stator forming one of the cylindrical side walls of the chamber and the core forming the other cylindrical side wall of the chamber, and barrier means forming the chamber into a plurality of series-connected sections in which the liquid is contained.

16. The actuator described in claim 13 characterized by a stator power supply having a dropping voltage with increase in current load.

17. The actuator described in claim 16 characterized by the stator power supply comprising a transformer with loose coupling between the primary and secondary circuits.

References Cited by the Examiner
UNITED STATES PATENTS

| | | | |
|---|---|---|---|
| 853,789 | 5/1907 | Holden | 103—1 |
| 2,948,118 | 8/1960 | Carlson | 103—1 |
| 2,962,718 | 11/1960 | Hilgert | 103—1 |
| 2,977,050 | 3/1961 | Sparrow | 103—1 |
| 3,032,993 | 5/1962 | Cole | 103—1 |
| 3,046,893 | 7/1962 | Carlson | 103—1 |
| 3,048,113 | 8/1962 | Hilgert | 103—1 |
| 3,066,607 | 12/1962 | Cole | 103—1 |

LAURENCE V. EFNER, *Primary Examiner.*